United States Patent
Greenwood

(10) Patent No.: US 6,683,527 B1
(45) Date of Patent: Jan. 27, 2004

(54) SECURITY SYSTEM

(75) Inventor: Jeremy John Greenwood, West Midlands (GB)

(73) Assignee: Land Rover, Warwick (GB)

( * ) Notice: Subject to any disclaimer, the term of this patent is extended or adjusted under 35 U.S.C. 154(b) by 0 days.

(21) Appl. No.: 09/762,755

(22) PCT Filed: Aug. 9, 1999

(86) PCT No.: PCT/GB99/02612

§ 371 (c)(1),
(2), (4) Date: Feb. 12, 2001

(87) PCT Pub. No.: WO00/11292

PCT Pub. Date: Mar. 2, 2000

(30) Foreign Application Priority Data

Aug. 20, 1998 (GB) .............................. 9818073

(51) Int. Cl.$^7$ .............................. G05B 19/00

(52) U.S. Cl. ................ 340/5.61; 340/5.64; 340/5.72; 340/426.1; 340/426.16; 340/539.1; 340/539.11; 340/10.2; 340/10.3; 340/10.4; 342/42; 342/51; 714/748; 714/749; 307/10.2; 370/343; 370/480

(58) Field of Search ................ 340/5.61, 5.64, 340/5.72, 426.1, 539.1, 539.11, 539.23, 426.16, 10.1, 10.3, 10.4, 10.2; 342/42, 51; 455/509, 515, 510; 370/343, 480; 307/10.2; 714/748, 749

(56) References Cited

U.S. PATENT DOCUMENTS

| | | | | |
|---|---|---|---|---|
| 5,347,280 A | * | 9/1994 | Schuermann | 342/42 |
| 5,686,902 A | * | 11/1997 | Reis et al. | 340/10.2 |
| 5,952,935 A | * | 9/1999 | Mejia et al. | 340/10.3 |

* cited by examiner

Primary Examiner—Michael Horabik
Assistant Examiner—Yves DaLencourt
(74) Attorney, Agent, or Firm—Davis & Bujold PLLC

(57) ABSTRACT

A security system which is suitable for use in a vehicle. The security system is a passive entry and passive re-mobilization system in which a security controller transmits a command signal LCs to a remote transponder, which replies with a LF response signal LRs. If an LF response signal is not received in response to the transmission of a command signal LCs, the security controller re-transmits the command signal, again as an LF command signal LCs. On determining that a command signal is a re-transmitted command signal, the remote transponder re-transmits the response signal as an UHF response signal URs.

33 Claims, 2 Drawing Sheets

SECURITY SYSTEM

This invention relates to security systems and in particular, but not exclusively, to a security system suitable for use in a vehicle.

BACKGROUND OF THE INVENTION

It is known to provide a protected area such as a building or a vehicle with a security system which includes a passive entry feature and one system of this type is disclosed in EP 0 218 251. Such passive security, systems may, in addition or in the alternative, be applied to the starting system off a vehicle to provide passive re-mobilisation of an engine. Interference from unrelated radio frequency sources can cause problems for systems of this type.

It is also known to transmit signals from a portable transponder in more than one frequency range. One arrangement of this type is shown in EP 0440974, in which the transponder is used to perform different functions in each range. In one range it sends security signals to the vehicle and in a second range it is operative to open remotely a garage door.

In circumstances where there is a disruption in the normal operating conditions of some types of security system, it is possible to vary parameters of a signal from a remote transponder between successive transmissions thereof. One system in which this occurs is disclosed in GB 2282252, and in this system parameters of the response signal are altered on the basis of measured values, i.e. received signal strength and/or measured battery power. It is a possible disadvantage of this arrangement that it is necessary to provide means in the remote transponder to determine the level of these values and this might add complexity and expense to the system.

SUMMARY OF THE INVENTION

It is an object 6f this invention to provide an improved security system.

According to the invention there is provided a security system comprising a security control means and a remote transponder which are arranged in use to communicate in a range of channels using command and response signals transmitted in one or more of said channels, said security control means being arranged in use to transmit a said command signal in a said channel, said remote transponder being arranged in use, in response to a receipt of said command signal, to transmit a said response signal initially in an initial said channel, said security control means being arranged, if it does not successfully receive a said response signal, to re-transmit said command signal, wherein said remote transponder is arranged to determine if a command signal is a re-transmitted command signal and, if it determines that a said command signal is a re-transmitted said command signal, to re-transmit said response signal in one or more of said channels which is/are different to said initial channel.

Said remote transponder may be arranged to determine that a particular said command signal is a re-transmitted said command signal if it receives, that particular said command signal within a time slot of a predetermined duration which commences on or after it has received an earlier said command signal.

Said security control means may be arranged, to modify said command signal before re-transmitting it, such that said modified re-transmitted command signal includes: information identifying it to said remote transponder as a re-transniitted said command signal.

Said information may be indicative of which different said channel or channels is or are to be used to re-transmit said response signal in reply to said re-transmitted command signal.

Said "channel of transmission of said command signal may operate in the Low Frequency band (LF).

Said initial channel of transmission of said response signal may operate in the Low Frequency band (LF).

In response to the detection of a re-transmitted said command signal, said response signal may be re-transmitted in a said channel which operates in the Ultra High Frequency band (UHF).

A re-transmission of said command signal may be performed in a said channel which operates in the Low Frequency band (LF).

Said remote transponder may further comprise a remote locking and/or unlocking means having a transmitter stage, wherein said re-transmission of said response signal is performed using said transmitter stage and in at least one said channel used for at least one of said remote locking or unlocking.

Said security control means may be arranged to receive said response signals in any of said range of channels and may further comprise a scanning means arranged in use to scan said range of channels in order to determine in which said channel or channels said response signal or said re-transmitted response signal can be received.

Said remote transponder may be arranged, in response to a detection of a re-transmitted said command signal, to re-transmit said response signal in a first different one of said channels and then in at least a second different one of said channels.

Said different channel or channels in which said response signal is re-transmitted may be substantially preset in said remote transponder.

Said security control means may be arranged to scan said range of channels for a said response signal or a said re-transmitted response signal by tuning itself to each of said channels and remaining tuned to that said channel for long enough to detect the presence of data being transmitted in that said channel.

Said security control means may be arranged to re-transmit said command signal if it does not successfully receive a said response signal within a time slot of predetermined duration which commences on or after an initial transmission of said command signal.

Said response signal may be produced by modulating said command signal and said modulation may be in the order of 2.5% of said command signal.

The security system may comprise the security system of a vehicle.

The invention also provides a method of controlling a security system, the security system comprising a security control means and a remote transponder which are arranged in use to communicate in a range of channels using command and response signals transmitted in one or more of said channels, said security control means being arranged in use to transmit a said command signal in a said channel, said remote transponder being arranged in use, in response to a receipt of said command signal, to transmit a said response signal initially in an initial said channel, said security control means being arranged, if it does not successfully receive a said response signal, to re-transmit said command signal, the method including the steps of:

a) determining if a command signal is a re-transmitted command signal; and b) re-transmitting, if a said command signal is determined to be a re-transmitted said command signal, said response signal in one or more of said channels which is/are different to said initial channel.

The method may include determining that a particular said command signal is a re-transmitted said command signal if said remote transponder receives that particular said command signal within a time slot of a predetermined duration which commences on or after it has received an earlier said command signal.

The method may include modifying said command signal before re-transmitting it, such that said modified re-transmitted command signal includes information identifying it to said remote transponder as a re-transmitted said command signal.

The method may include indicating in said information which different said channel or channels is or are to be used to re-transmit said command response signal in reply to said re-transmitted command signal.

The method may include transmitting said command signal in a said channel which operates in the Low Frequency band (LF).

The method may include transmitting said initial response signal in a said channel which operates in the Low Frequency band (LF).

The method may include, in response to the detection of a re-transmitted said command signal, re-transmitting said response signal in a said channel which operates in the Ultra High Frequency band (UHF).

The method may include re-transmitting said command signal in a said channel which operates in the Low Frequency band (LF).

Said remote transponder may further comprise a remote locking and/or, unlocking means having a transmitter stage and the method may include re-transmitting said response signal using said transmitter stage and in at least one said channel used for at least one of said remote locking or unlocking.

Said security control means may be capable of receiving a said response signal in any of said channels and may further comprise a scanning means capable of scanning said channels, and the method may include scanning said range of channels in order to determine in which said channel or channels said response signal or said re-transmitted response signal can be received.

The method may include, in response to a detection of a re-transmitted said command signal, re-transmitting said response signal in a first different one of said channels and then in at least a second different one of said channels.

The method may include substantially presetting in said remote transponder said channel or channels in which said response signal is re-transmitted.

The method may include scanning said range of channels for a said response signal or a said re-transmitted response signal by tuning said security control means to each of said channels and remaining tuned to that said channel for long enough to detect the presence of data being transmitted in that said channel.

The method may include re-transmitting said command signal if said security control means does not successfully receive a said response signal within a time slot of predetermined duration which commences on or after an initial transmission of said command signal.

The method may include producing said response signal by modulating said command signal and may include modulating said command signal by about 2.5%.

BRIEF DESCRIPTION OF THE DRAWINGS

The invention will now be described by way of example only and with reference to the accompanying drawings, in which.

DESCRIPTION OF THE PREFERRED EMBODIMENTS

Figure 1:
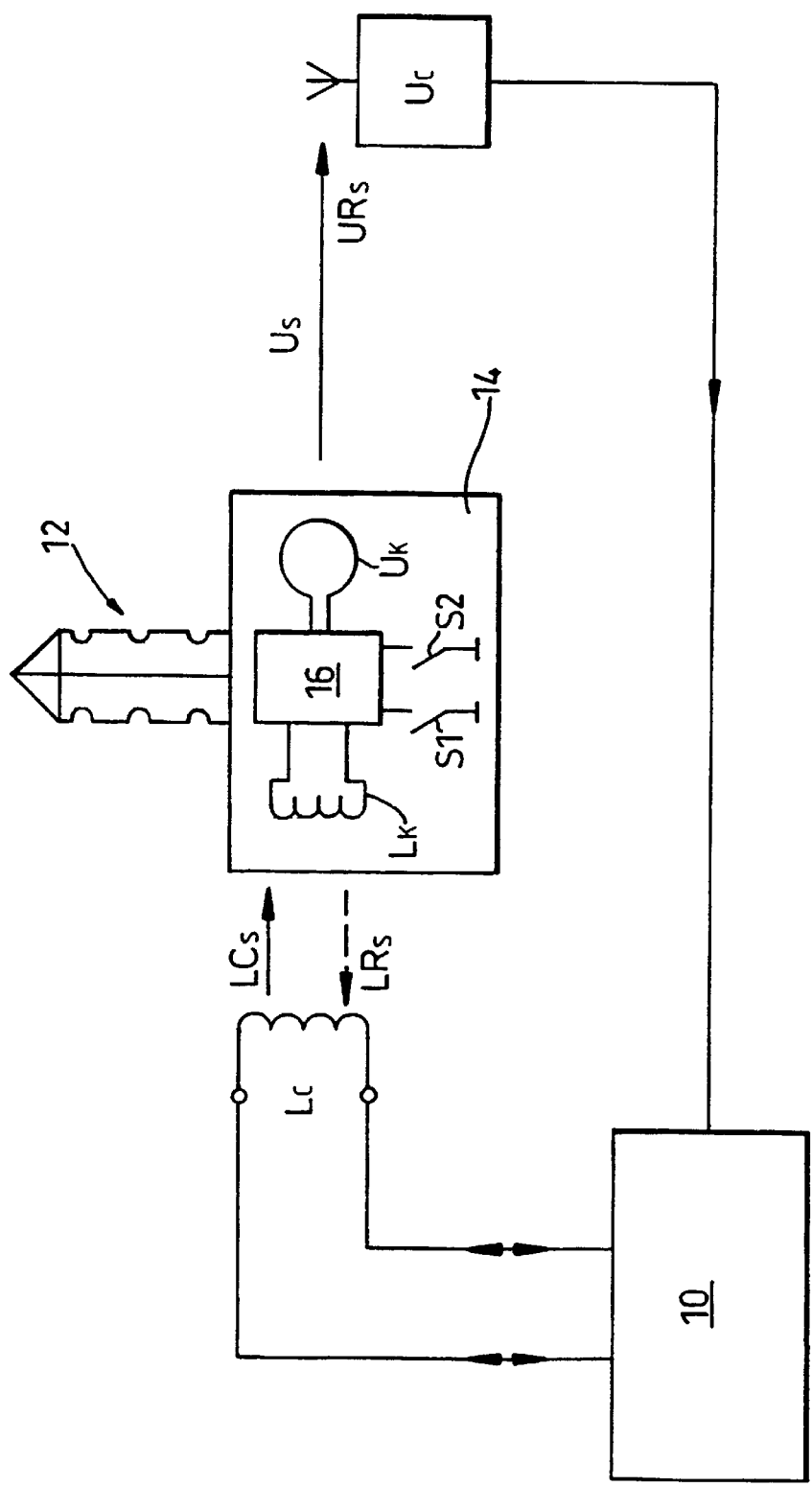
FIG. 1 is a schematic diagram of a security system according to the invention.
Figure 2:
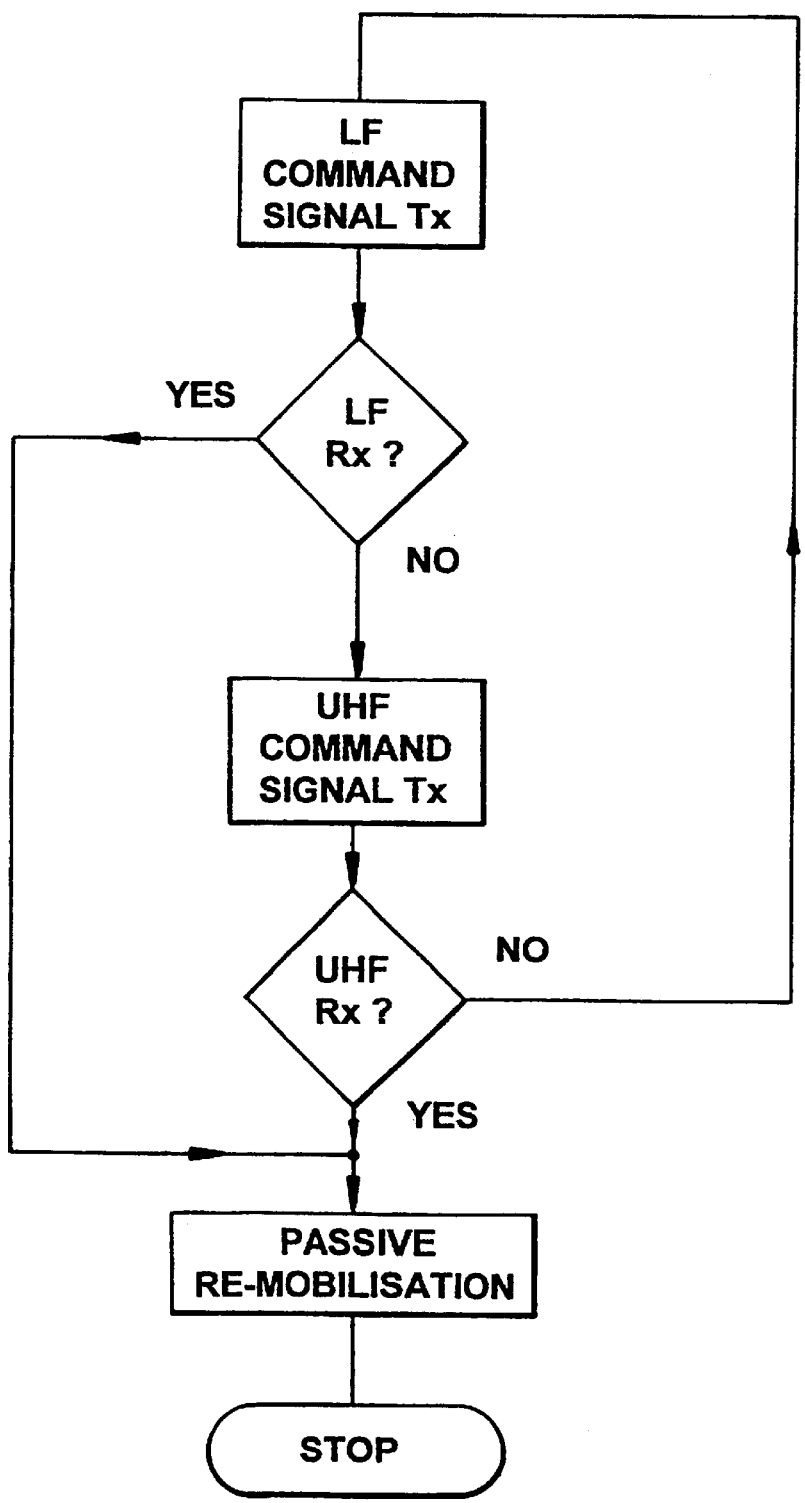
FIG. 2 is a flow diagram of a method of operating the security system of FIG. 1.

Referring to the figures, a security system for a vehicle (not shown further) comprises a passive entry and passive re-mobilisation system and includes a security control means in the form of a security controller 10 which is fitted to the vehicle and which is arranged in use to detect the likely presence of a smart key 12 in the proximity of the vehicle.

For passive entry purposes, the security controller 10 is arranged to detect the presence of the key 12 by monitoring a micro-switch which is included in a door handle assembly (neither shown) and which switch is activated when the door handle is operated. For passive re-mobilisation purposes, a further micro-switch is included in an ignition switch assembly (neither shown), that micro-switch being activated when the key 12 is inserted so as to indicate to the security controller 10 the presence of the key 12 in the ignition/starter switch.

The key 12 includes a remote transponder 14 which itself includes a control logic 16 which controls two transponder stages, a Low Frequency (LF) transmitter/receiver stage $L_k$ and an Ultra High Frequency (UHF) transmitter stage $U_k$.

Also included in the remote transponder 14 is a lock switch S1 and an unlock switch S2 which are push-button user operable and are arranged in use to transmit "lock vehicle/engine immobilise" and "unlock vehicle/engine re-mobilise" commands respectively to the security controller 10 by using the UHF transmitter $U_k$ to transmit UHF signals $U_s$. The switches S1, S2 can be used for remote implementation of lock-immobilise/unlock-remobilise instructions.

The security controller 10 includes an LF transmitter / receiver stage $L_c$ and an UHF receiver stage $U_c$ which are arranged to communicate with the transmitter/receiver stage $L_k$ and the UHF transmitter $U_k$ of the remote transponder 14 respectively.

The operation of the invention is now described with specific, but not limiting, reference to passive remobilisation.

When the security controller 10 detects the likely presence of the remote transponder 14 in the immediate vicinity of the ignition switch, it 10 transmits a command signal LCs in the LF band to the remote transponder 14 at about 125 kHz, which it 14 receives though the LF transmitter/receiver stage $L_k$. The control logic 16 decodes the received command signal LCs and, if it is recognised as a genuine command signal LCs, the control logic 16 causes the transmitter receiver stage $L_k$ to transmit in LF, also at about 125 kHz, a response signal LRs back to the security controller 10 which it 10 receives through its LF transmitter/receiver stage $L_c$. In this manner, the LF response signal LRs is initially transmitted in a predetermined channel which is substantially fixed in the transponder 14.

The response signal LRs is received by tuning the receiver stage $L_k$ to the frequency of the initial response channel or by scanning through the channels, in similar fashion to that outlined below for UHF channels, until the channel in which it LRs can be received is determined. The reader is also referred to our co-pending application GB 9827361.8

(which is published as GB 2332548A) for further details of a similar such scanning operation.

On receipt of a valid LF response signal LRs, the security controller 10 performs one or more predetermined security functions, for example allowing passive" re-mobilisation of and immobilised engine so as to allow starting of the vehicle. The security controller 10 performs the passive re-mobilisation function in substantially the same manner it would an equivalent "unlock/engine re-mobilise" function of the appropriate push-button switch S2.

If the security controller 10 does not receive the LF response signal LRs within a time slot of predetermined duration which commences after the transmission of the command signal LCs, the security controller 10 is arranged to determine (e.g. assume) that the command signal LCs has either not, been received by the remote transponder 14 or that the LF response signal LRs has been corrupted. If the LF response signal LRs is not received within the time slot, the security controller 10 is arranged to re-transmit the command signal LCs, still in the LF band.

The controller 10 transmits its command signals LCs on LF alone because they are only transmitted when a transponder 14, is likely to be present in the immediate vicinity of the ignition switch and can be transmitted at quite high power, for example the command signal LCs may be transmitted at about 40 V peak-to-peak, and this is considered to be adequate to ensure sufficiently reliable reception by the transponder 14.

In this embodiment, the transponder 14 produces its LF response signal LRs by loading a received command signal LCs and modulating it by about 2.5%. Although it is unlikely that a command signal LCs will be interfered with to the extent that it is not received because of its power, it can be seen that it might be possible to suffer sufficient interference to the response signal LRs to swamp the about 2.5% modulation.

If the remote transponder 14 receives a second command signal LCs, for example during a predetermined time slot following its first receipt of the command signal LCs, the transponder control logic 16 is arranged to treat such a further command signal LCs as a re-transmitted command signal. The remote transponder 14 is arranged to reply to a re-transmitted command signal with a UHF response signal URs using its UHF transmitter $U_k$.

In the UHF band, the transmitter $U_k$ operates at a bandwidth in the order of 480 kHz with 32 channels, which are each about 15 kHz wide and centred around a frequency of about 433 MHz. When responding to a re-transmitted command signal, the remote transponder 14 is arranged to transmit the UHF response signal URs in two of the 36 channels, first in one channel and then in a second one. Using successive transmissions means that harmonics are not generated and the problems associated with frequency shift keying (FSK) do not occur, which in turn means that channel spacing is not restricted as it would be if FSK were to be used.

The channels used for the UHF response signal URs are fixed in the remote transponder 14 during manufacture by the inclusion of a pair of surface acoustic wave resonators (SAWs) (not shown separately) which are included in the control logic 16. The SAWs are connected in parallel and arranged to be capable of being switched on independently and selectively.

To send the UHF response signal URs, one of the SAWs is turned on using a pin diode and causes the UHF response signal URs to be transmitted in the channel in which its resonant frequency falls. This SAW is then turned off and the other SAW is turned on, again using a pin diode. The UHF response signal URs is then transmitted in the channel in which the resonant frequency of the second SAW falls. The second SAW is then turned off and transmission of the UHF response signal URs for that receipt of the re-transmitted command signal is complete.

The SAWs are selected, such that their nominal resonant frequencies result in the transmission channels of the UHF response signal URs having a spacing of at least three or four UHF channels between them, or more preferably a spacing of about at least 100 kHz.

The SAWs frequencies cannot be guaranteed to be fixed, as their nominal resonant frequency will drift with time and variations in temperature. Because of this, it is not possible to specify with absolute certainty which of the channels will be used to transmit the UHF response signal URs and the UHF receiver stage $U_c$ must therefore scan all the channels to find the one or more than one in which the UHF response signal URs can be detected.

To scan across all the channels, the UHF receiver stage $U_c$ scans the channels by tuning itself to each one in turn and waiting in each channel long enough to detect a UHF response signal URs in an expected format. One example of the detection of a correct format can be shown by providing the UHF response signal URs with a long preamble of logic "1" bits so as to make it easy to find and then keeping the UHF receiver stage $U_c$ tuned into each channel long enough to detect a recognisable portion of this preamble.

When the UHF receiver stage $U_c$ has found a channel in which the UHF response signal URs from the remote transponder 14 appears to be present, it uses an automatic frequency control (AFC) process to centre on the transmitted frequency and stays there until the data becomes implausible or until a time out has expired.

If the data becomes implausible and under-runs or over-runs, that event is noted by incrementing a register value for that channel by a constant. A different constant is used when incrementing the register for each of an under-run and an over-run. The constants are not equal and the constant used for an over-run is the greater because an over-run usually indicates that the signal has been subjected to interference.

If the register value for a given channel reaches one of a series of thresholds, the UHF receiver stage $U_c$ is arranged to assume that there is an UHF interfering signal which is causing it to waste time looking for the UHF response signal URs in that channel at that time. When this happens, the UHF receiver stage $U_c$ first reduces the sensitivity of its receiver portion for the affected channel and does so in graduated steps (for example 4, 8, 12 dB). If the register value exceeds a preset maximum despite the reduction or reductions in sensitivity, the UHF receiver stage $U_c$ will finally shut down for that channel or channels which is/are then missed out completely. At the end of each scan, the register value for each channel is decremented.

A different way of deciding that the data is implausible would be to stay centred onto a string of detected data for a predetermined time period, the expiry of which could be pre-programmed into the UHF receiver stage $U_c$ as indicative that the data being received does not comprise a plausible signal. For example, such a time-out could be set to correspond to an over-run condition.

When the UHF receiver stage $U_c$ has detected a plausible response signal it is passed on to the security controller 10 and is followed by a message which identifies the channel in which the UHF response signal URs was detected. The security controller 10 uses this information about that channel to make a comparison with the other channel in which the UHF response signal URs was detected and to judge whether the channel spacing is sufficient to indicate a valid UHF response signal URs or one which has been interfered with. If the UHF response signal URs is detected in only one channel, then information about which channel that might be is of limited use, except for example to verify that the UHF response signal URs was detected in a valid channel.

By sending out the UHF response signal URs on first one channel and then on another one, instead of for example both at the same time, the likelihood of generating undesirable harmonics is significantly reduced.

In a modification to the invention, the remote transponder 14 operates in UHF at around a substantially fixed frequency in the order of 433 MHz and is arranged to transmit the UHF response signal URs at that substantially fixed frequency. This provides a simplified version of the invention which may prove cheaper to produce and would be adequate for use in markets where there is not much crime.

The use of a bandwidth of about 480 kHz around a central frequency of about 433 MHz and which is divided into 32 channels each being about 15 kHz wide, provides security against the use of a relay transmitter/receiver and is particularly useful in markets where there is a high risk of vehicle crime.

By transmitting the UHF response signal URs on more than one channel, the user gains an advantage in that a channel spacing of three or four can be used to transmit the signals closer to each other than would be easy to detect using a commercially available UHF receiver of reasonable cost and which might have a bandwidth of, for example, 500 kHz. In this manner, a thief trying to use a code scanner based on such technology would find it more difficult to collect the UHF response signal URs and to re-transmit it. The UHF response signals URs would appear as a single signal and that is what would be re-transmitted after capture or relaying. Because the thief s re-transmitted or relayed signal is not two signals of narrow bandwidth which are close to each other, the security controller 10 could determine that such a signal was false or corrupted. Channel spacing of three or four also provides sufficient spacing to take account of the tolerances and drift of any SAW used. It would be even better in this respect to set the channel spacing at 100 kHz or more.

In a modification to the invention, the security controller is arranged to modify the command signal LCs before re-transmitting it so as to specify to the transponder 14 that it 14 should re-transmit its response signal as a UHF response signal URs. In the version of the invention in which the UHF transmitter stage $U_k$ operates by transmitting the UHF response signal URs in more than one of a plurality of UHF channels, it would also be possible to modify the command signal LCs further before re-transmitting it, so as to specify in which one or more of those UHF channels the transponder 14 should transmit its UHF response signal URs.

While the invention has been described with particular reference to passive re-mobilisation, it will be appreciated that its scope is not so limited. The apparatus and method are also suitable for the passive entry feature. For example, a passive entry command signal could be initiated on operating a door handle. It would also be possible to use the same or different command and response signal for each of passive entry and passive remobilisation.

What is claimed is:

1. A security system comprising a security control means and a remote transponder which are arranged in use to communicate in a range of channels using command and response signals transmitted in one or more of said channels, said security control means being arranged in use to transmit a said command signal in a said channel, said remote transponder being arranged in use, in response to a receipt of said command signal, to transmit a said response signal initially in an initial said channel, said security control means being arranged, if it does not successfully receive a said response signal, to re-transmit said command signal, wherein said remote transponder is arranged to determine if a command signal is a re-transmitted command signal and, if it determines that a said command signal is a re-transmitted said command signal, to re-transmit said response signal in one or more of said channels which is/are different to said initial channel.

2. A security system according to claim 1, wherein said remote transponder is arranged to determine that a particular said command signal is a re-transmitted said command signal if it receives that particular said command signal within a time slot of a predetermined duration which commences on or after it has received an earlier said command signal.

3. A security system according to claim 1, wherein said security control means is arranged to modify said command signal before re-transmitting it, such that said modified re-transmitted command signal includes information identifying it to said remote transponder as a re-transmitted said command signal.

4. A security system according to claim 2, wherein said information is indicative of which different said channel or channels is or are to be used to re-transmit said response signal in reply to said re-transmitted command signal.

5. A security system according to claim 1, wherein said channel of transmission of said command signal operates in the Low Frequency band (LF).

6. A security system according to claim 1, wherein said initial channel of transmission of said response signal operates in the Low Frequency band (LF).

7. A security system according to claim 1, wherein, in response to the detection of a re-transmitted said command signal, said response signal is re-transmitted in a said channel which operates in the Ultra High Frequency band (UHF).

8. A security system according to claim 1, wherein a re-transmission of said command signal is performed in a said channel which operates in the Low Frequency band (LF).

9. A security system according to claim 1, wherein said remote transponder further comprising a remote locking and/or unlocking means having a transmitter stage, wherein said re-transmission of said response signal is performed using said transmitter stage and in at least one said channel used for at least one of said remote locking or unlocking.

10. A security system according to claim 1, wherein said security control means is arranged to receive said response signals in any of said range of channels and further comprises a scanning means arranged in use to scan said range of channels in order to determine in which said channel or channels said response signal or said re-transmitted response signal can be received.

11. A security system according to claim 10, wherein said remote transponder is arranged, in response to a detection of a re-transmitted said command signal, to re-transmit said response signal in a first different one of said channels and then in at least a second different one of said channels.

12. A security system according to claim 10, wherein said security control means is arranged to scan said range of channels for a said response signal or a said re-transmitted response signal by tuning itself to each of said channels and remaining tuned to that said channel for long enough to detect the presence of data being transmitted in that said channel.

13. A security system according to claim 10, wherein said security control means is arranged to scan said range of channels for a said response signal or a said re-transmitted response signal by tuning itself to each of said channels and remaining tuned to that said channel for long enough to detect the presence of data; being transmitted in that said channel.

14. A security system according to claim 1, wherein said security control means is arranged to re-transmit said command signal if it does not successfully receive a said response signal within a time slot of predetermined duration which commences on or after an initial transmission of said command signal.

15. A security system according to claim 1, wherein said response signal is produced by modulating said command signal.

16. A security system according to claim 15, wherein said modulation being in the order of 2.5% of said command signal.

17. A security system according to claim 1, comprising the security system of a vehicle.

18. A method of controlling a security system, the security system comprising a security control means and a remote transponder which are arranged in use to communicate in a range of channels using command and response signals transmitted in one or more of said channels, said security control means being arranged in use to transmit a said command signal in a said channel, said remote transponder being arranged in use, in response to a receipt of said command signal, to transmit a said response signal initially in an initial said channel, said security control means being arranged, if it does not successfully receive a said response signal, to re-transmit said command signal, the method including the steps of:

a) determining if a command signal is a re-transmitted command signal; and b) re-transmitting, if a said command signal is determined to be a re-transmitted said command signal, said response signal in one or more of said channels which is/are different to, said initial channel.

19. A method according to claim 18, including determining that a particular said command signal is a re-transmitted said command signal if said remote transponder receives that particular said command signal within a time slot of a predetermined duration which commences on or after it has received an earlier said command signal.

20. A method according to claim 18, including modifying said command signal before re-transmitting it, such that said modified re-transmitted command signal includes information identifying it to said remote transponder as a re-transmitted said command signal.

21. A method according to claim 20, including indicating in said information which different said channel or channels is or are to be used to re-transmit said response signal in reply to said re-transmitted command signal.

22. A method according to claim 18, including transmitting said command signal in a said channel which operates in the Low Frequency band (LF).

23. A method according to claim 18, including transmitting said initial response signal in a said channel which operates in the Low Frequency band (LF).

24. A method according to claim 18, including, in response to the detection of a re-transmitted said command signal, re-transmitting said response signal in a said channel which operates in the Ultra High Frequency band (UHF).

25. A method according to claim 18, including re-transmitting said command signal in a said channel which operates in the Low Frequency band (LF).

26. A method according to claim 18, said remote transponder further comprising a remote locking and/or unlocking means having a transmitter stage and the method including re-transmitting said response signal using said transmitter stage and in at least one said channel used for at least one of said remote locking or unlocking.

27. A method according to claim 18, said security control means being capable of receiving a said response signal in any of said channels and further comprising a scanning means capable of scanning said channels, the method including scanning said range of channels in order to determine in which said channel or channels said response signal or said re-transmitted response signal can be received.

28. A method to according to claim 27, including, in response to a detection of a re-transmitted said command signal, re-transmitting said response signal in a first different one of said channels and then in at least a second different one of said channels.

29. A method according to claim 27, including substantially presetting in said remote transponder said channel or channels in which said response signal is re-transmitted.

30. A method according to claim 27, including scanning said range of channels for a said response signal or a said re-transmitted response signal by tuning said security control means to each of said channels and remaining tuned to that said channel for long enough to detect the presence of data being transmitted in that said channel.

31. A method according to claim 18, including re-transmitting said command signal if said security control means does not successfully receive a said response signal within a time slot of predetermined duration which commences on or after an initial transmission of said command signal.

32. A method according to claim 18, including producing said response signal by modulating said command signal.

33. A method according to claim 32, including modulating said command signal by about 2.5%.

* * * * *